2,911,985
UMBRELLA SHANK

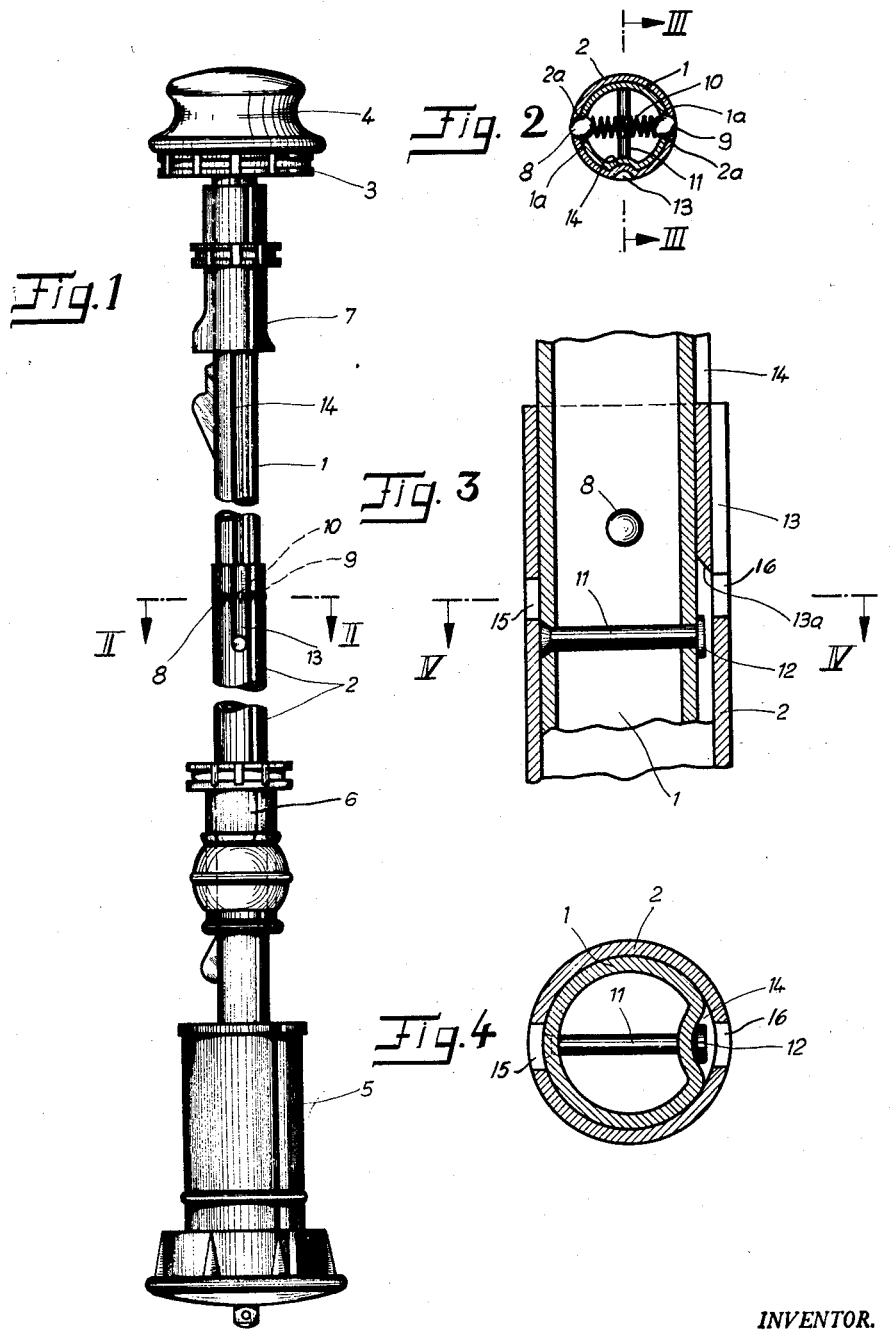

Günter H. Granrath, Solingen-Weyer, Germany, assignor to Kortenbach & Rauh Kommanditgesellschaft, Solingen-Weyer, Germany Application December 26, 1957, Serial No. 705,395

Claims priority, application Germany January 26, 1957

3 Claims. (Cl. 135—46)

The present invention relates to a pocket umbrella and, more particularly, to a pocket umbrella shank which may for instance be equipped with a main runner and an auxiliary runner. With shanks of this type it is known in the inner shank portion to arrange spring loaded arresting balls which are adapted to engage corresponding bores in the outer shank portion. The heretofore known arrangements of this type have the drawback that repairs of such springs are rather difficult to carry out. Furthermore, it was necessary in order to carry out such repairs to remove the crown and the handle whereupon the inner shank portion had to be pushed through the outer shank portion in order to be able to gain access to the said spring.

It is, therefore, an object of the present invention to provide an improved pocket umbrella shank which will overcome the above mentioned drawbacks.

It is another object of this invention to provide a pocket umbrella shank with an outer and an inner shank portion and spring loaded arresting balls, which will afford a simplified method of gaining access to the spring acting upon the arresting balls.

These and other objects and advantages of the invention will appear more clearly from the following specification in connection with the accompanying drawing, in which:

Fig. 1 is a view of the umbrella shank according to the present invention.

Fig. 2 is a cross section taken along the line II—II of Fig. 1 but on a slightly enlarged scale thereover.

Fig. 3 shows on a scale larger than that of Fig. 2 a longitudinal section through a portion of the shank, said section being taken along the line III—III of Fig. 2.

Fig. 4 is a transverse section through the shank along the line IV—IV of Fig. 3.

The umbrella shank according to the present invention is characterized primarily in that in addition to the balls in the inner shank portion there is provided a transverse pin with a head which latter rests in a longitudinal groove-like depression or corrugation of the outer shank portion. In conformity with the present invention, the said pin is so arranged that the head thereof will abut the lower end of the longitudinal corrugation in the outer shank portion when the normal pulled-out or expanded position of the shank is accidentally exceeded. The outer shank portion is provided with passage means adapted to be aligned with the axis of said transverse pin, preferably when the shank is in its pulled-out or expanded position, so that the pin can easily be removed. When the pin has been removed, the inner shank portion can without difficulties be pulled out of the outer shank portion so that easy access will be gained to the arresting balls.

Referring now to the drawing in detail, the umbrella shank illustrated therein consists in a manner known per se of an inner shank member 1 and an outer shank member 2. The inner shank member carries the umbrella crown 3 with the knob 4 and is telescopically slidable in the outer shank member. The outer shank member 2 has connected thereto a handle 5. Slidably mounted on the shank members 2 and 1 is the main runner 6 and the auxiliary runner 7 respectively which latter is used in connection with the auxiliary ribs (not shown in the drawing). In order to be able to hold the two shank members 1 and 2 in their pulled-out or expanded position, two arresting balls 8 and 9 are provided which are loaded by a spring 10 as is particularly clearly shown in Fig. 2. The inner shank member 1 and the outer shank member 2 are provided with corresponding bores 1a, 2a for receiving the said arresting balls 8, 9.

In addition to the said arresting balls 8 and 9, there is, in conformity with the present invention, provided a pin 11 with a head 12. This pin extends through the inner shank member 1 and has its head 12 located in a depressed longitudinal groove or corrugation 13 of the shank member 2, said groove preferably being formed by depressing a portion of the outer shank member 2. When the two shank members are in their normal pulled-out position, the balls 8 and 9 engage both the bores 1a and 2a while the head 12 almost abuts the lower end 13a of the longitudinal depression or corrugation 13 thereby making it impossible that the inner shank member be accidentally pulled out altogether of the outer shank member 2. Thus, if accidentally, the inner shank member 1 exceeds its normally pulled-out position, head 12 of pin 11 abuts the end 13a of the corrugation 13.

The inner shank member 1 is provided with a longitudinal depression or corrugation 14 in which the longitudinal depression or corrugation 13 of shank member 2 slides when the inner and outer shank members are telescopically moved relative to each other. The outer shank member 2 is provided with axially aligned bores 15 and 16 which in the pulled-out position of the shank members 1 and 2 are in alignment with the axis of the pin 11 so that if a repair of the locking mechanism is required, the pin 11 can easily be removed in order to allow removal of the inner shank member 1 from the outer shank member 2. The pin 11 which if designed with one head only would have a tight fit in shank member 1, and the head of the pin would, of course, be located in the corrugation 14. However, if desired, pin 11 may be designed as a rivet as shown in Fig. 3. In this instance, however, in order to be able to take the shank members apart for purposes of repair or replacement of spring 10, it will be necessary slightly to grind or chisel off head 12 of the rivet so that the rivet can be removed from the umbrella shank without damaging the same.

It is, of course, to be understood that the present invention is, by no means, limited to the particular construction shown in the drawing but also comprises any modifications within the scope of the appended claims.

What I claim is:

1. An umbrella shank movable selectively into a collapsed or expanded position, which comprises in combination: a first shank member, a second shank member telescopically movable in said first shank member selectively from a first position corresponding to the collapsed position of said shank into a second position corresponding to the expanded position of said umbrella shank and vice versa, spring-urged ball-shaped arresting means carried by one of said shank members for interlocking said shank members in response to said second shank member reaching said second position, and pin means carried by said second shank member and extending transverse thereto while being provided with a head, said first shank member being provided with abutment means for engagement with said head for preventing said second shank member from accidentally leaving said first shank member, said first shank member having transverse passage means arranged so as to be substantially axially aligned with said pin means when said second shank member occupies said second position for selectively removing said pin means through said passage means.

2. An umbrella shank movable selectively into a collapsed or expanded position, which comprises in combination: a first tubular shank member having a corrugation extending from a point intermediate its ends to one end thereof, a second tubular shank member telescopically movable in said first tubular shank member selectively from a first position corresponding to the collapsed position of said shank into a second position corresponding to the expanded position of said umbrella shank and vice versa, said second tubular shank member being provided with a corrugation corresponding to the corrugation of said first tubular shank member and slidably engaged by the corrugation of said first tubular shank member, spring-urged ball-shaped arresting means carried by one of said tubular shank members for interlocking said tubular shank members in response to said second tubular shank member reaching said second position, and pin means carried by said second tubular shank member and extending transverse thereto while being provided with a head, the head of said pin means being located within the corrugation of said second tubular shank member and interposed between the latter and a non-corrugated portion of said first tubular shank member while being in substantial alignment with the corrugation of said first tubular shank member, said head being adapted to engage the adjacent end of the corrugation of said first tubular shank member in response to said second shank member moving beyond said second position, whereby said second tubular shank member is prevented from accidentally leaving said first tubular shank member.

3. An umbrella shank according to claim 2, in which said pin means consists of a rivet.

References Cited in the file of this patent

UNITED STATES PATENTS

| | | |
|---|---|---|
| 795,717 | Morrow | July 25, 1905 |
| 1,049,360 | Hoffman | Jan. 7, 1913 |
| 1,486,772 | Lopez | Mar. 11, 1924 |
| 2,515,454 | Krumwiede | July 18, 1950 |